US 8,678,117 B2

(12) United States Patent
Carabelli et al.

(10) Patent No.: US 8,678,117 B2
(45) Date of Patent: Mar. 25, 2014

(54) ELECTRIC MOTOR WHEEL ASSEMBLY

(75) Inventors: Stefano Carabelli, Cesana Torinese (IT); Fabio Cavalli, Alessandria (IT)

(73) Assignee: Three Tilting Wheels S.R.L., Turin (IT)

( * ) Notice: Subject to any disclaimer, the term of this patent is extended or adjusted under 35 U.S.C. 154(b) by 38 days.

(21) Appl. No.: 13/129,372

(22) PCT Filed: Nov. 14, 2008

(86) PCT No.: PCT/IT2008/000712
§ 371 (c)(1),
(2), (4) Date: Dec. 6, 2011

(87) PCT Pub. No.: WO2010/055534
PCT Pub. Date: May 20, 2010

(65) Prior Publication Data
US 2012/0067654 A1    Mar. 22, 2012

(51) Int. Cl.
*B60K 7/00*    (2006.01)

(52) U.S. Cl.
USPC ........................................ 180/65.51; 301/6.5

(58) Field of Classification Search
USPC .......... 180/55, 65.1, 65.21, 65.51, 65.6, 65.7, 180/65.8; 301/6.5; 903/906, 951
See application file for complete search history.

(56) References Cited

U.S. PATENT DOCUMENTS

| | | | | |
|---|---|---|---|---|
| 3,161,249 A | * | 12/1964 | Zuppiger et al. ................ | 180/10 |
| 5,581,136 A | * | 12/1996 | Li ................................. | 310/67 R |
| 6,768,932 B2 | * | 7/2004 | Claypole et al. .............. | 700/279 |
| 7,270,204 B2 | * | 9/2007 | Taniguchi et al. ........... | 180/65.51 |
| 7,701,103 B2 | * | 4/2010 | Kurokawa ..................... | 310/179 |
| 7,938,211 B2 | * | 5/2011 | Yoshino et al. ............. | 180/65.51 |
| 8,008,817 B2 | * | 8/2011 | Lamperth ....................... | 310/77 |
| 8,316,973 B2 | * | 11/2012 | Walter et al. ............... | 180/65.51 |
| 2002/0023791 A1 | * | 2/2002 | Kima et al. .................. | 180/65.5 |
| 2003/0159866 A1 | * | 8/2003 | Claypole et al. ............ | 180/65.5 |
| 2006/0180412 A1 | * | 8/2006 | Steers .......................... | 188/157 |
| 2007/0045066 A1 | * | 3/2007 | Sadanowicz et al. ... | 188/218 XL |
| 2007/0257570 A1 | * | 11/2007 | Walter et al. ................ | 310/67 R |
| 2008/0053719 A1 | * | 3/2008 | Yoshino et al. ................ | 180/55 |
| 2008/0053726 A1 | * | 3/2008 | Marsh et al. ................ | 180/65.5 |
| 2009/0032321 A1 | * | 2/2009 | Marsh et al. .............. | 180/65.51 |
| 2010/0139999 A1 | * | 6/2010 | Park .......................... | 180/65.51 |
| 2010/0163323 A1 | * | 7/2010 | Pickholz ................... | 180/65.51 |

(Continued)

FOREIGN PATENT DOCUMENTS

| | | |
|---|---|---|
| GB | 1 451 165 | 9/1976 |
| JP | 2007145060 | 6/2007 |
| WO | 9113779 | 9/1991 |

OTHER PUBLICATIONS

International Search Report and Written Opinion of the International Searching Authority, for PCT/IT2008/000712, dated Oct. 15, 2009 (7 pages).

*Primary Examiner* — Katy M Ebner
*Assistant Examiner* — Brodie Follman
(74) *Attorney, Agent, or Firm* — McCraken & Frank LLC

(57) ABSTRACT

A motor wheel assembly for a motor vehicle comprises a radial flux brushless electric motor having a plurality of stator magnets arranged along a circumferential path; a wheel; first connecting means to connect motor to wheel in a torque transfer manner and second connecting means suitable for connecting motor to the motor vehicle. The motor wheel assembly defines a seat interrupting the sequence of stator magnets along the circumferential path and is suitable for housing a caliper of a braking system of the motor vehicle.

7 Claims, 2 Drawing Sheets

(56) References Cited

U.S. PATENT DOCUMENTS

| | | | |
|---|---|---|---|
| 2010/0176651 A1* | 7/2010 | Thomas et al. | 301/6.8 |
| 2010/0187954 A1* | 7/2010 | Kendall et al. | 310/67 R |
| 2010/0230194 A1* | 9/2010 | James | 180/65.51 |
| 2010/0263959 A1* | 10/2010 | Hoebel et al. | 180/443 |
| 2010/0300782 A1* | 12/2010 | Walter et al. | 180/65.51 |
| 2011/0024206 A1* | 2/2011 | Sagara et al. | 180/65.1 |
| 2011/0115316 A1* | 5/2011 | Isogai et al. | 310/71 |
| 2011/0175431 A1* | 7/2011 | Yoshino et al. | 301/6.5 |
| 2012/0132473 A1* | 5/2012 | Weber et al. | 180/58 |
| 2012/0215389 A1* | 8/2012 | Perry et al. | 701/22 |
| 2012/0248850 A1* | 10/2012 | Hirano | 301/6.5 |

* cited by examiner

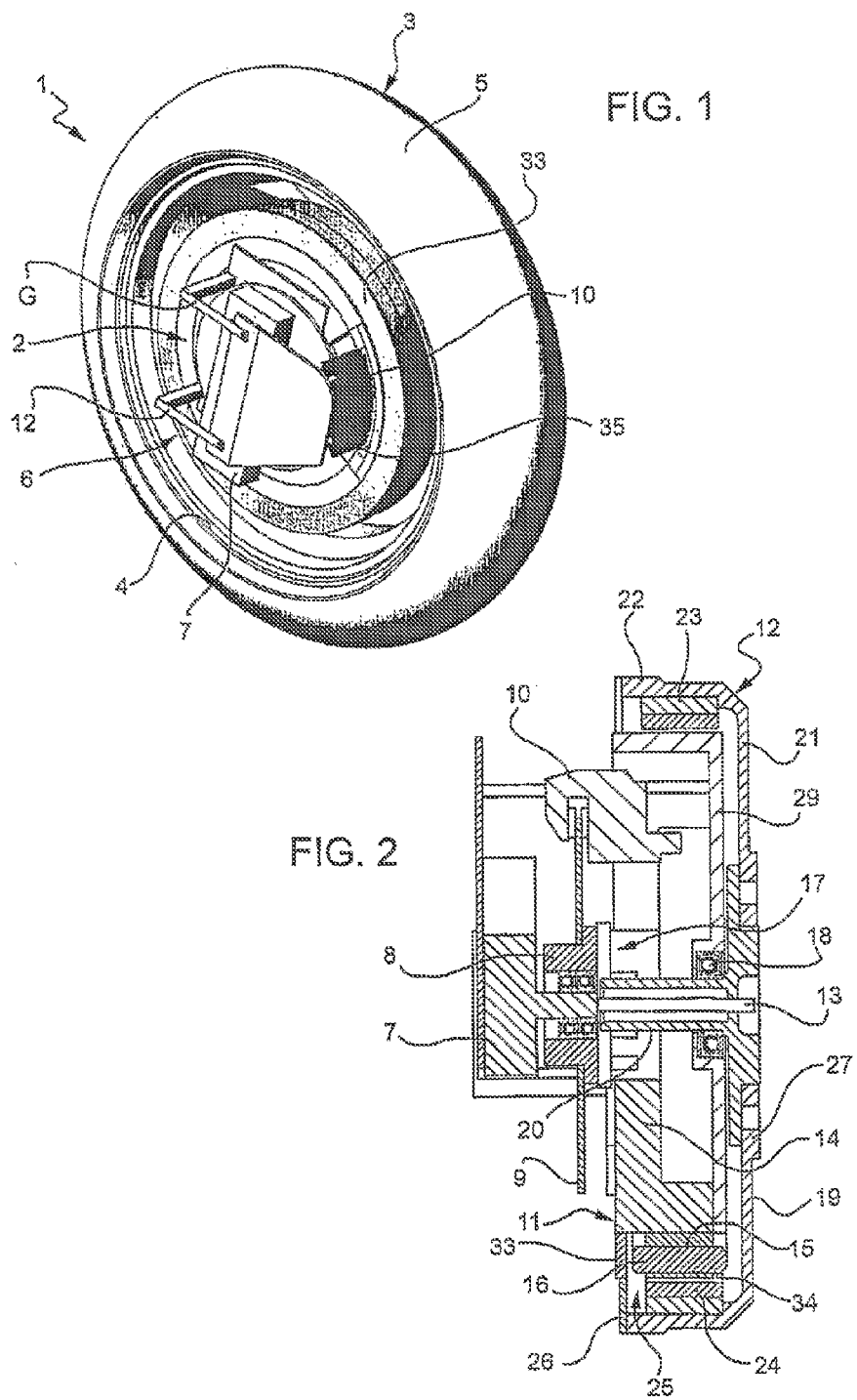

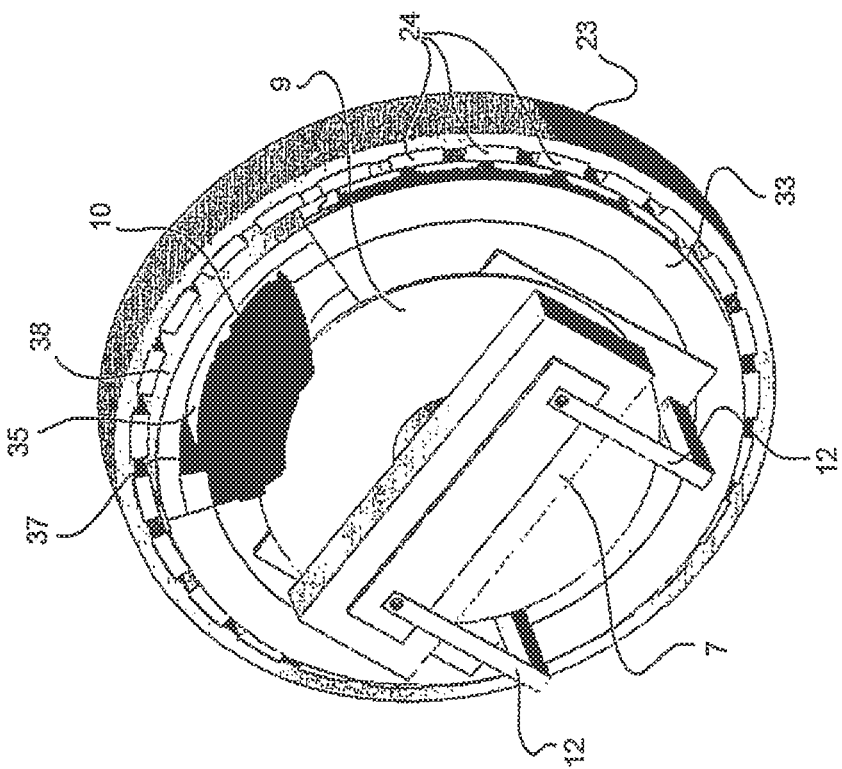
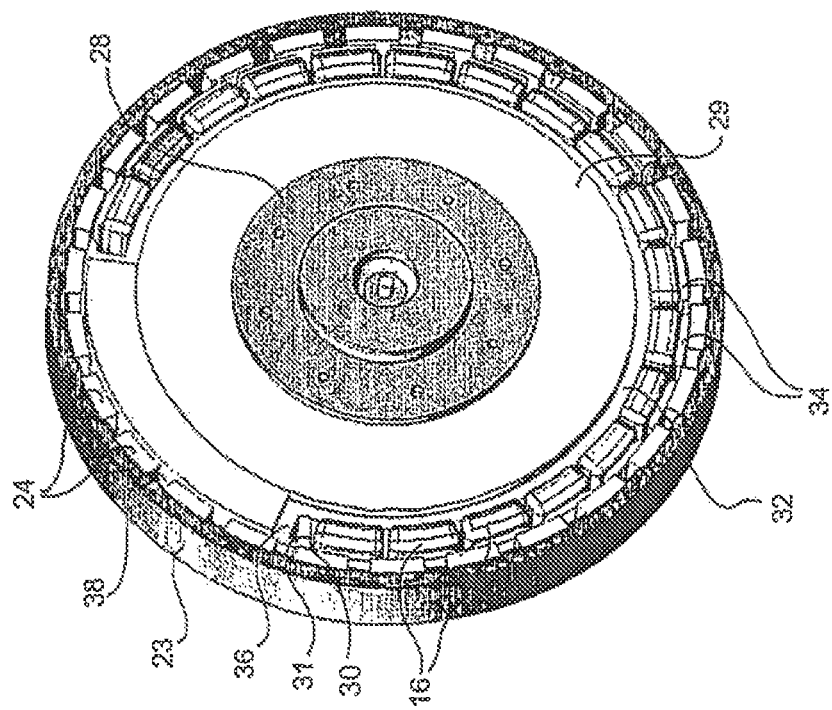

ELECTRIC MOTOR WHEEL ASSEMBLY

TECHNICAL FIELD

The present invention relates to an electric motor wheel assembly for a motor vehicle, for example for a car.

BACKGROUND ART

Recently, the increased sensitivity of the market to environmental issues led car makers to spend efforts in developing hybrid vehicles and electric power vehicles having an electric engine to drive the wheels.

Power density of electric engines is such that it is possible to design a motor radially mounted within the rim of the wheel in all or some of the wheels of the vehicle, thus defining respective motor wheel assemblies.

Normally, a braking device, either a caliper or a shoe brake, is mounted within the radial dimension of the rim. Therefore, a design problem rises how to configure the electric motor and the braking device for the new vehicles.

In a known proposed solution to this problem, the electric motor is radially housed within the rim and the braking element is a shoe brake is concentric with the electric motor. Such solution requires the design from scratch of the braking element and is not suitable for retrofitting an already existing vehicle. In case of a restyling of the vehicle, the eventual redesign of the braking element would also require a new homologation procedure and is therefore costly.

In another solution, the braking element is eliminated and the electric motor is used to brake the vehicle. Also in this case the braking system shall be redesigned and the vehicle homologated again.

DISCLOSURE OF INVENTION

The scope of the present invention is to provide an electric motor wheel assembly free from the aforementioned drawbacks.

The scope of the present invention is achieved by an electric motor wheel according to claim 1.

BRIEF DESCRIPTION OF THE DRAWINGS

For a better understanding of the present invention, said vehicle is further described also with reference to the attached figures, wherein:

FIG. 1 is a perspective view of a the motor wheel assembly according to the present invention;

FIG. 2 is a radial cross section of FIG. 1;

FIG. 3 is a frontal perspective view of FIG. 2 with removed portions for a clearer understanding; and FIG. 4 is a rear perspective view of FIG. 3.

BEST MODE FOR CARRYING OUT THE INVENTION

In FIG. 1, indicated as a whole by 1 is motor wheel assembly for a motor vehicle such as a car or another two/three wheeled vehicle.

Motor wheel 1 comprises a radial flux reverse brushless motor 2, a wheel 3 having a rim 4 and a tire 5, and connecting means 6 to connect motor 2 to a suspension system of the vehicle (schematically shown).

In particular, (FIG. 2) the suspension system comprises a hub carrier 7 connected to a shock absorber (not shown) of the suspension system, a hub 8 rotatably mounted to hub carrier 7 and a braking device. Braking device preferably comprises a disk 9 rigidly connected to hub 8 and a caliper 10 rigidly connected to hub carrier 7 and cooperating with disk 9.

Motor 2 comprises a stator 11 connected to hub carrier 7 through a pair of arms G of connecting means 6 and a rotor 12 connected to hub 8 through a threaded joint 13 of connecting means 6. In particular arms G are spaced and are substantially loaded by the torque acting on stator 11. Threaded joint 13 rigidly connects rotor 12 to hub 8. In this way, connecting means 6 has two constraint units specifically designed for stator 11 and rotor 12 respectively. According to a further embodiment of the present invention, stator 11 is connected to caliper 10 or to other elements fixed with respect to hub carrier 7.

Stator 11 comprises a body 14 to support a plurality of magnetic packs 15 along a circular path and a plurality of electromagnets 16. Body 14 has a through hole 17 defining a seat for a bearing 18 that radially supports rotor 12.

Rotor 12 comprises a support element 19 defining a tubular portion 20 supported by bearing 18 inside through hole 17, a web 21 perpendicular to tubular portion 20 and a cylindrical wall 22 axially extending from a periphery of web 21.

Cylindrical wall 22 has an internal surface surrounding body 14 and supporting a ring 23 made of a ferromagnetic material and a plurality of permanent magnets 24 supported on ring 23 and facing electromagnets 16.

Body 14 and support element 19 define a chamber 25 sealed from the external environment and protecting electromagnets 16 and permanent magnets 24 from contaminants. Preferably, to achieve sealing of chamber 25, rotor 12 comprises a ring plate 26 fixed to cylindrical wall 22 and extending towards body 14, a sliding seal interposed between body 14 and ring plate 26 and a sliding seal advantageously integrated in bearing 18.

On an opposite axial side of ring plate 26, web 21 of rotor 12 defines releasable connecting means 27 for rim 4 of wheel 3. Connecting means 27 may comprise through hole to house bolts or studs coupling with suitable holes of the rim.

According to a preferred embodiment of the present invention, support element 19 comprises two parts, namely a body defining said tubular portion 20 and a flange 28 extending from an end portion of tubular portion 20, and a body comprising web 21 rigidly connected to flange 28 and cylindrical wall 22. In this way, the shape of the two bodies is simple to obtain and manufacturing is improved.

FIG. 3 shows a perspective view of electric motor 2 wherein web 21 and cylindrical wall 22 are removed.

Body 14 comprises a circular web 29 facing web 21 and a peripheral portion 30 attached to web 29 and defining a slot 31. Slot 31 has a radial dimension suitable to house electromagnets 16 and is open in the axial direction towards web 21 and in the radial direction towards permanent magnets 24. Slot 31 is defined by a cylindrical wall 32 and by a shoulder 33 radially extending from cylindrical wall 32 towards plate ring 26. The sliding seal cited above is interposed between plate ring 26 and shoulder 33. Slot 31 is further delimited along the radial direction by a plurality of digits 34 substantially equispaced along the circumferential dimension.

According to the present invention, body 14 defines a seat 35 interposed between two adjacent electromagnets 16 along the circumferential direction and designed to house along the circumferential and radial dimension caliper 10 when motor wheel 1 is mounted on the suspension system.

In particular, seat 35 is delimited by body 14 through a pair of lateral walls 36, 37 along the circumferential direction, a rounded head wall 38 on top and web 29 towards rotor 12. In order to guarantee the sealing of chamber 25, lateral walls 36, 37 and head wall 38 are continuous along the circumferential direction and web 29 is continuous in the radial direction. Furthermore, head wall 38 has the same outer diameter as shoulder 33 and sliding sealing means are continuous along the circumferential direction and are interposed between ring plate 26 and head wall 38 also.

In use, motor 2 is controlled by a control unit and powered by chargeable batteries (not shown). Seat 35 defines an interruption in the regular series of electromagnets 16 whose effects on the regularity of output torque can be controlled by the electronic control unit. For example, each electromagnet 16 has a respective power terminal (not shown) connected to the control unit. In this way, each electromagnet can be controlled independently.

In forward and backward running of the vehicle, motor 2 drives wheel 3 and caliper 10 brakes on disk 9 to decelerate. Particles of the friction element sliding on disk 9 during braking are prevented from entering inside motor 2 because electromagnets 16 and permanent magnets 24 are sealingly housed within chamber 25.

The advantages of motor wheel 1 according to the present invention are the following.

When motor wheel 1 is mounted on the suspension system, caliper 10 is housed in seat 35 so that no real modifications to the braking system are needed. Furthermore, with a suitable redesign of the rim only, axial dimension is compact.

The perturbation introduced by seat 35 can be controlled and improved by the engine control unit especially in the case where the power terminal are different from those of a standard DC brushless motor, i.e. power terminals are more than three.

Chamber 25 is sealed and maintenance of motor wheel 1 is reduced.

Radial flux brushless motor allows to obtain compact axial dimensions.

Lastly, it is clear that modifications and variations are can be made to the above described embodiment without departing from the scope of protection as defined by the appended claims.

The motor wheel assembly 1 can be used in electric vehicles or in hybrid vehicles. In the latter case, the motor wheel assembly 1 has the same configuration as the one showed in the attached figures and the internal combustion engine drives other wheel(s). In an example of a three-wheeled vehicle having two front steering wheels, the rear wheel is driven by the internal combustion engine only and the two front wheels are motor wheels not connected to the internal combustion engine. However, with appropriate changes, motor wheel assembly 1 can also be configured to receive the axle connected to the differential.

The invention claimed is:

1. Motor wheel assembly for a motor vehicle comprising a radial flux brushless electric motor having a plurality of stator magnets arranged along a circumferential path; a wheel; first connecting means to connect said motor to said wheel in a torque transfer manner and second connecting means suitable for connecting said motor to said motor vehicle, wherein said motor wheel assembly defines a seat interrupting the sequence of said stator magnets along said circumferential path and is suitable for housing a caliper of a braking system of said motor vehicle, wherein said motor comprises a stator body shaped to define said seat with continuous walls configured to seal said stator magnets from said seat at least along the circumferential and axial direction, wherein a rotor of said motor comprises a support unit supporting a plurality of permanent magnets and said first connecting means are interposed between said support unit and said wheel, wherein said stator body and said support unit define a chamber closed around said plurality of stator magnets and permanent magnets.

2. Motor wheel assembly according to claim 1, comprising more than three power terminals to power said stator magnets.

3. Motor wheel assembly according to claim 1, comprising a sliding sealing means interposed between said stator body and said support unit to prevent contamination of said chamber.

4. Motor wheel, assembly according to claim 1, wherein said stator body and said rotor are permanently connected to form a non-demountable unit and wherein said first connecting means are demountable.

5. Motor wheel assembly according to claim 1, wherein said stator body defines a slot housing said stator magnets and said chamber comprises said slot.

6. Motor vehicle comprising an internal combustion engine, at least a second wheel and a motor wheel assembly according to claim 1, wherein said internal combustion engine drives said at least second wheel and not said motor wheel assembly.

7. Motor wheel assembly according to claim 3, wherein said rotor comprises a ring plate fixed to a cylindrical wall, said ring plate extending towards said stator body, said sliding means comprising a sliding seal being interposed between said stator body and said ring plate and wherein said stator body has a through hole defining a seat for a bearing that radially supports said rotor and wherein said sliding means comprises a further sliding seal integrated in said bearing.

* * * * *